(12) United States Patent
Dantice

(10) Patent No.: US 8,764,032 B1
(45) Date of Patent: Jul. 1, 2014

(54) SHOPPING CART

(71) Applicant: John Dantice, El Centro, CA (US)

(72) Inventor: John Dantice, El Centro, CA (US)

( * ) Notice: Subject to any disclaimer, the term of this patent is extended or adjusted under 35 U.S.C. 154(b) by 0 days.

(21) Appl. No.: 13/679,572

(22) Filed: Nov. 16, 2012

(51) Int. Cl.
*B62B 3/00* (2006.01)

(52) U.S. Cl.
USPC .................................... 280/47.35; 280/47.38

(58) Field of Classification Search
USPC ............. 280/33.991, 33.992, 33.995, 33.997, 280/33.998, 47.34, 47.35, 47.41, 47.38, 280/651, DIG. 4
See application file for complete search history.

(56) References Cited

U.S. PATENT DOCUMENTS

| | | | | |
|---|---|---|---|---|
| D147,135 S | * | 7/1947 | Moran | D12/129 |
| D148,128 S | * | 12/1947 | Brottman | D34/21 |
| 2,443,236 A | * | 6/1948 | Gallagher | 280/47.35 |
| 2,615,726 A | * | 10/1952 | Brottman | 280/47.35 |
| D183,950 S | * | 11/1958 | Skaller | D34/19 |
| 2,993,702 A | * | 7/1961 | Gill | 280/643 |
| 3,044,801 A | | 7/1962 | Vicany | |
| 3,375,018 A | * | 3/1968 | Close | 280/33.991 |
| 3,497,234 A | * | 2/1970 | Schray | 280/33.993 |
| 4,116,456 A | * | 9/1978 | Stover et al. | 280/33.993 |
| 4,560,180 A | * | 12/1985 | Ulmer | 280/33.993 |
| 4,771,840 A | | 9/1988 | Keller | |
| D318,550 S | | 7/1991 | Stefano | |
| 5,702,114 A | * | 12/1997 | Downing et al. | 280/47.23 |
| 5,816,593 A | * | 10/1998 | Che | 280/87.041 |
| 5,918,891 A | * | 7/1999 | Russell | 280/33.991 |
| 6,237,924 B1 | | 5/2001 | Reiland et al. | |
| 6,520,513 B2 | * | 2/2003 | Presley-Mays | 280/32.5 |
| D473,691 S | * | 4/2003 | Kolada et al. | D34/21 |
| 6,575,480 B2 | | 6/2003 | McKelvey | |
| 7,093,841 B2 | | 8/2006 | Conrad | |
| D549,919 S | | 8/2007 | Ash et al. | |
| 7,300,062 B2 | * | 11/2007 | Otterlee et al. | 280/33.992 |
| 7,407,170 B1 | * | 8/2008 | Williams | 280/33.996 |
| 7,494,135 B2 | | 2/2009 | Ash et al. | |
| 7,591,509 B2 | | 9/2009 | Almy | |
| 7,819,467 B1 | | 10/2010 | Schimmeyer | |
| 2007/0278271 A1 | * | 12/2007 | Koren | 224/407 |
| 2011/0115177 A1 | * | 5/2011 | de Sousa | 280/47.35 |
| 2011/0304110 A1 | * | 12/2011 | Long | 280/33.992 |
| 2012/0319367 A1 | * | 12/2012 | Hermosillo | 280/33.993 |
| 2013/0038042 A1 | * | 2/2013 | Cimino | 280/651 |

* cited by examiner

*Primary Examiner* — Katy M Ebner
*Assistant Examiner* — Brodie Follman
(74) *Attorney, Agent, or Firm* — Goldstein Law Offices, P.C.

(57) ABSTRACT

A shopping cart having a rear-facing seat for intermittent sitting and resting while shopping. The seat is in a barrier-less rear region of a rear open alcove, allowing a user to freely access the seat for sitting and to freely exit the seat for standing. The seat hingedly connects to the cart, allowing the seat to selectively lower in a down position for sitting and selectively swing upwards for accessing a storage area below the seat. The seat operationally connects to a brake, actuating the brake when the seat is in the down position, the brake engaging at least one wheel of the cart when the brake is actuated. The rear region of the cart has a pair of arms defining the alcove, each arm having a horizontal grab bar, providing support when a user grabs the bar upon rising from sitting.

11 Claims, 5 Drawing Sheets

SHOPPING CART

TECHNICAL FIELD

The present disclosure relates generally to a shopping cart. More particularly, the present disclosure relates to a shopping cart with a rear-facing seat for intermittent sitting and resting.

BACKGROUND

People love to shop in big box stores, discount retailers, mega-grocery stores and similar venues. The bigger the venue, the more variety of goods is available. The selection of prices and styles increases with an increase in the square footage of a store.

Walking through large store is sometimes a challenge for small children and people with health or mobility issues. Motorized carts are available on a limited basis, but many shoppers do not require a high level of assistance that the motorized carts provide.

In addition to motorized shopping carts, carts have been modified to have internal seats. However, these carts require another person to push the cart while the small child or person with health or mobility problems sits inside. Small children in particular are placed into internal seats that cannot easily be exited.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a seat for intermittent sitting and resting while shopping for a user with health or mobility issues. Accordingly, an aspect of an example embodiment in the present disclosure provides a shopping cart with a rear-facing seat for intermittent sitting and resting while shopping.

Another aspect of an example embodiment in the present disclosure is to provide a seat on a cart that a user freely accesses for intermittent sitting. Accordingly, an aspect of an example embodiment in the present disclosure provides a seat on a shopping cart in an open alcove having a barrier-less rear region, allowing a user to freely access a rear-facing seat for sitting and to freely exit the seat for standing and pushing the shopping cart through a store.

A further aspect of an example embodiment in the present disclosure is to provide a shopping cart with a seat that selectively lowers when needed for sitting. Accordingly, an aspect of an example embodiment in the present disclosure provides a seat hingedly connected to a shopping cart, allowing the seat to selectively lower in a down position for sitting and selectively stow in an up position when not needed.

Yet another aspect of an example embodiment in the present disclosure is to provide a seat on a shopping cart that stops cart movement when a user sits down upon the seat. Accordingly, an aspect of an example embodiment in the present disclosure provides a seat operationally connected to a brake, actuating the brake when the seat is in the down position and a user sitting down on the seat, the brake engaging at least one wheel on the base when the brake is actuated.

The present disclosure describes a shopping cart for a user with health or mobility issues having a rear-facing seat for intermittent sitting and resting while shopping. The seat is in a barrier-less rear region of a rear open alcove, allowing a user to freely access the rear-facing seat for sitting and to freely exit the seat for standing and pushing the shopping cart through a store. The seat hingedly connects to the cart, allowing the seat to selectively lower in a down position for sitting and selectively stow in an up position when not needed. The seat operationally connects to a brake, actuating the brake when the seat is in the down position, the brake engaging at least one wheel on the base when the brake is actuated. The rear region of the cart has a pair of arms defining the alcove, each arm having a horizontal grab bar slightly above the seat, providing support when a user grabs the bar upon rising from sitting. The cart has a first front basket and a second rear basket under the seat that is accessible when the seat is in the up position.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
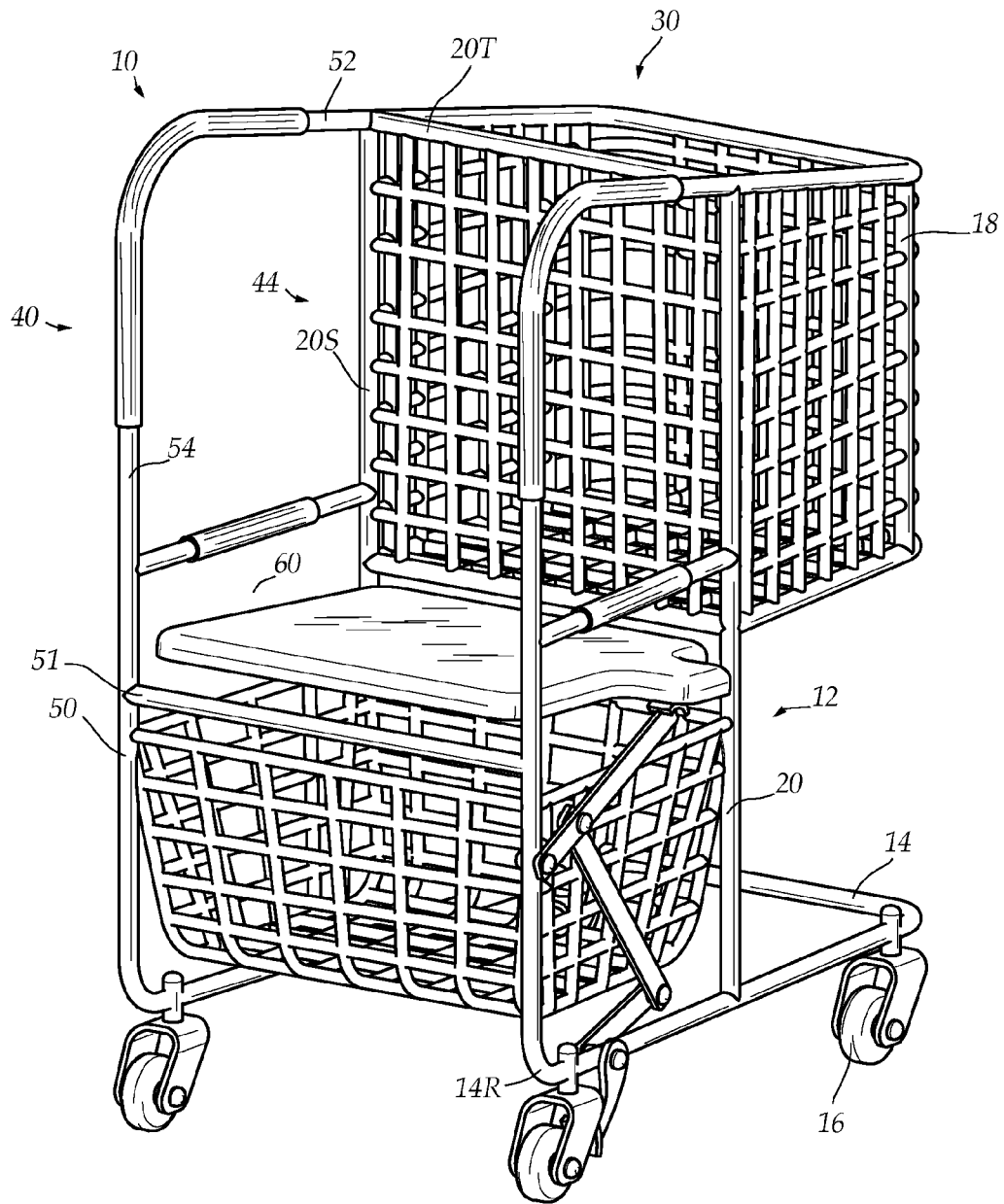
FIG. 1 is a dynamic perspective view of a shopping cart from the rear with a rear seat in a down position.

FIG. 1 illustrates a shopping cart 10 with a rear-facing seat 60 for intermittent sitting and resting by a user while shopping. The shopping cart is pushed by the user through a store, filling the cart with items. When the user needs to sit or rest during the shopping excursion, the cart immediately provides a seat integral with the cart for a short respite. The user does not need any other types of assistance devices when shopping with the shopping cart 10 of the present disclosure.

The shopping cart has a frame 12 with a vertical support 20. The support has a top 20T and a pair of sides 20S and bifurcates the cart into a front portion 30 and a rear portion 40. The vertical support attaches to a horizontal lower wheeled base 14, having a plurality of wheels 16 and a rear 14R.

The rear portion has a pair of arms 50. Each arm having a top segment 52 extending from the support rearwards connecting to a vertical segment 54 extending downwards and connecting to the base at the rear 14R, the arms and the support defining an open alcove 44 having a barrier-less rear region opposite the support. In the open alcove 44 of the rear portion 40, the rear-facing seat 60 connects to the support 20 substantially midway, the seat for sitting with a rear-facing orientation. The seat 60 hingedly connects to a horizontal bar, which is not seen in this view, the bar coupled to the support 20, substantially midway on the support. The open alcove is barrier-less, allowing a user to freely access the seat for sitting and to freely exit the seat for standing and resuming pushing the shopping cart through a store.

In another example embodiment, the vertical segments 54 extend up from the base 14R and end below the seat 60. The vertical segments connect with a horizontal bar 51 in the rear portion. The rear-facing seat hingedly coupled to the horizontal bar 51, the seat selectively rising to access storage below. The rear portion 40 is barrier-less, the seat preferably in the down position so that generally available for sitting.

The vertical support in the front portion 30 has an attached top shopping basket 18, the shopping basket attaching to and extending frontwards from the support.

Figure 2:
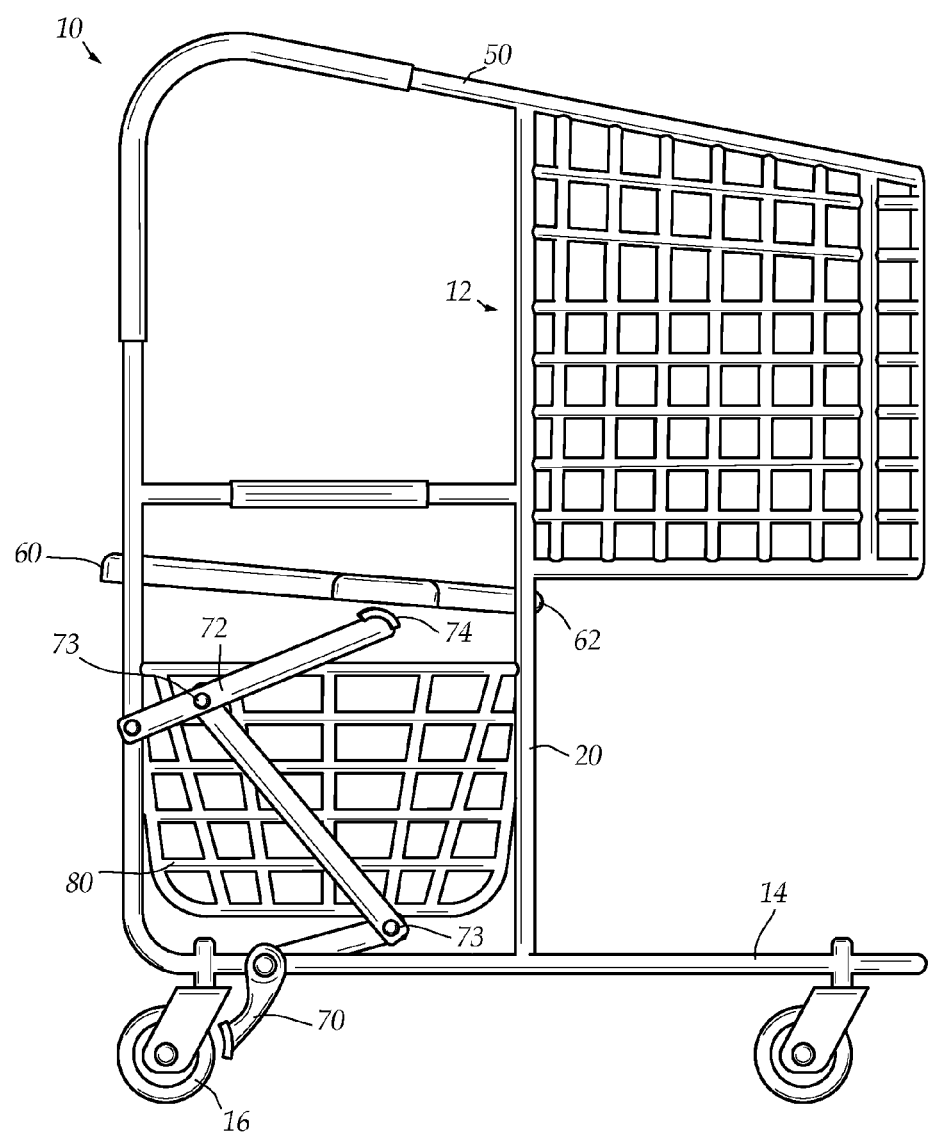
FIG. 2 is a side elevational view of the shopping cart with the rear seat in the down position.

In FIG. 2, the seat 60 is hingedly coupled by at least one hinge 62 to the support 20, allowing the seat to selectively lower in a down position for sitting. The foldable seat 60 is operationally connected to a brake 70, actuating the brake when the seat is in the down position and a user is sitting down on the seat, the brake engaging at least one wheel 16 on the base 14 when the brake is actuated.

In the embodiment illustrated in FIG. 2, the brake 70 is actuated by a hinged brake rod 73 with a spring and a top bumper 74. When the seat is in the down position and the user is sitting on the seat, the seat contacts the bumper, the brake rod compresses, pushing the brake 70 against the wheel 16.

Figure 3:
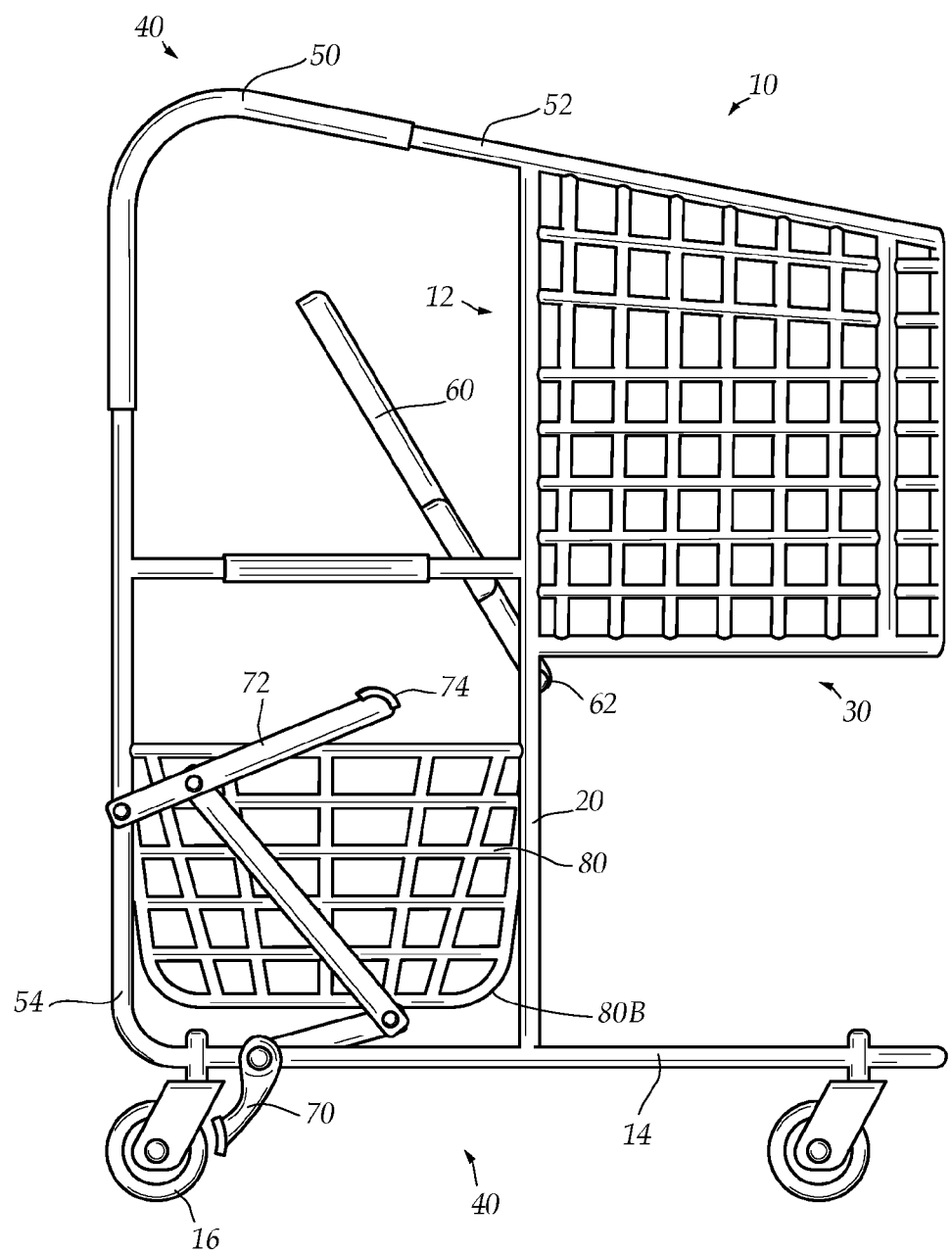
FIG. 3 is a side elevational view of the shopping cart with the rear seat swinging to an up position.

In FIG. 3, the seat is selectively swinging on the hinge 62 to permit access to a storage area below the seat 60. The brake rod 72 springs upwards, releasing the brake 70 from the wheel 16. In a further example embodiment, the seat selectively raises temporarily and does not lock in place, the seat starting in the down position, avoiding the possibility of the user forgetting to lower the seat before sitting.

In another example embodiment, the seat is hingedly connected to the horizontal bar, not shown in FIG. 3, between the vertical segments 54 and substantially midway on the vertical segments. The seat swings up on the hinge toward the user pushing the cart to permit access to the storage area below the seat, reversing the raising of the seat illustrated in FIG. 3. In a further example embodiment, the vertical segments connect the horizontal bar to the base 14, the vertical segments ending at the horizontal bar without connecting to the top segments of the arms.

The cart 10 has a second basket 80 in the rear portion 40 attaching to the frame 12, accessible when the seat 60 is in the up position. In a further example embodiment, the second basket has a bottom 80B, the bottom elevated above the base 14, providing a space for accommodating the base of another cart so that a plurality of carts can be nested by inserting the front portion of a first cart into the rear portion of a second cart.

Figure 4:
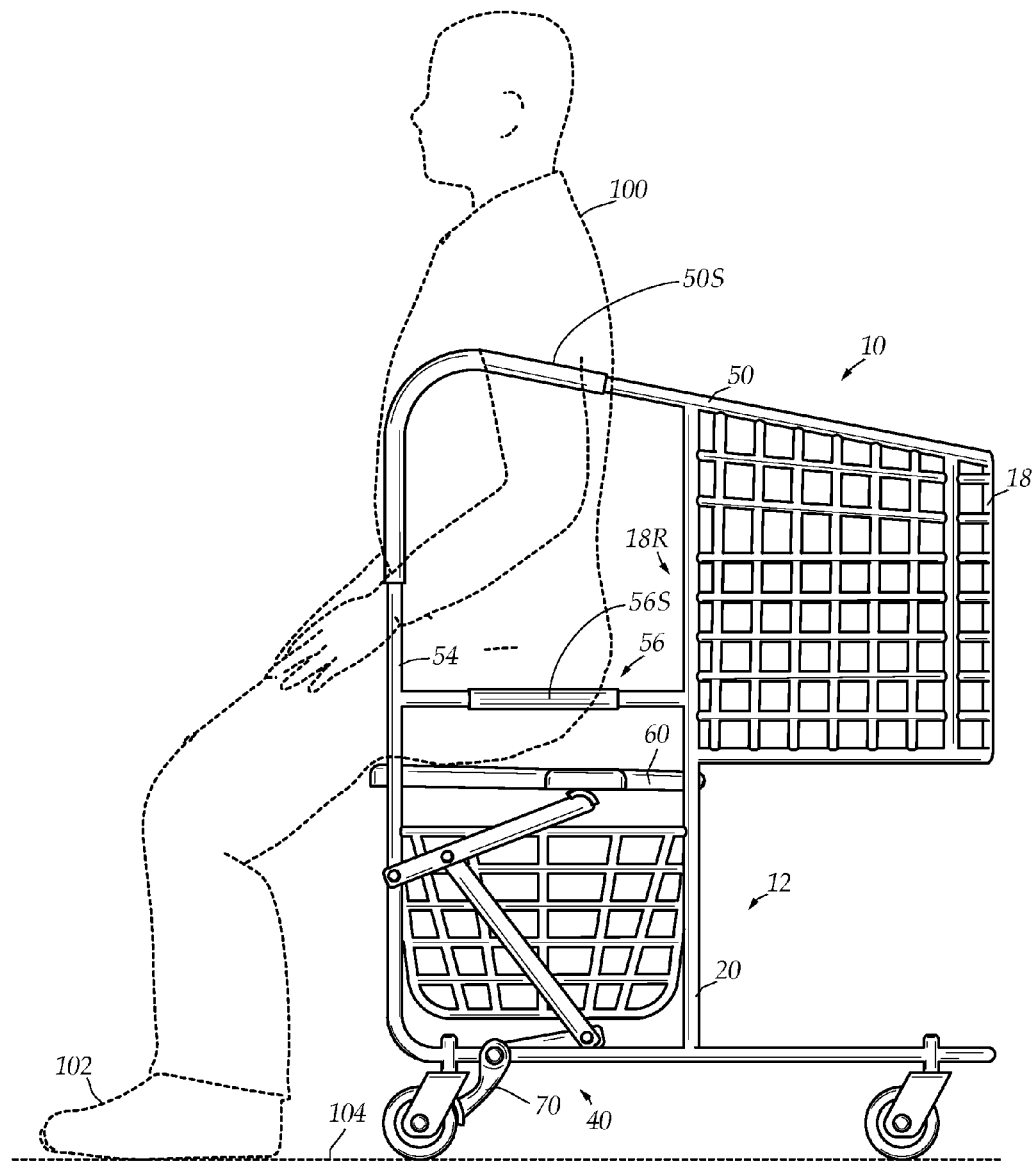
FIG. 4 is a side elevational view of the shopping cart with the rear seat in the down position, a shopper sitting on the seat.

Referring to FIG. 4, the frame 12 of the cart 10 has a pair of horizontal grab bars 56 slightly above the seat 60 when the seat is in the down position, each bar connecting one vertical segment 54 of the arm 50 to the side of the support 20 opposite the arm, the bar 56 providing support when a user grabs the bar for balance upon rising and seating. The arms 50 and grab bars 56 have a textured surface 50S, 56S for securely grabbing when rising and seating.

The top basket 18 has a rear wall 18R adjacent to the vertical support 20, the rear wall forming a seat back for the seat, so that the user can lean back if so desired. In a further example embodiment, the rear wall 18R hingedly connects to the frame 12 so that the rear wall folds in towards the basket so that the plurality of carts can be nested by inserting the front portion of the first cart into the rear portion of the second cart.

Figure 5:
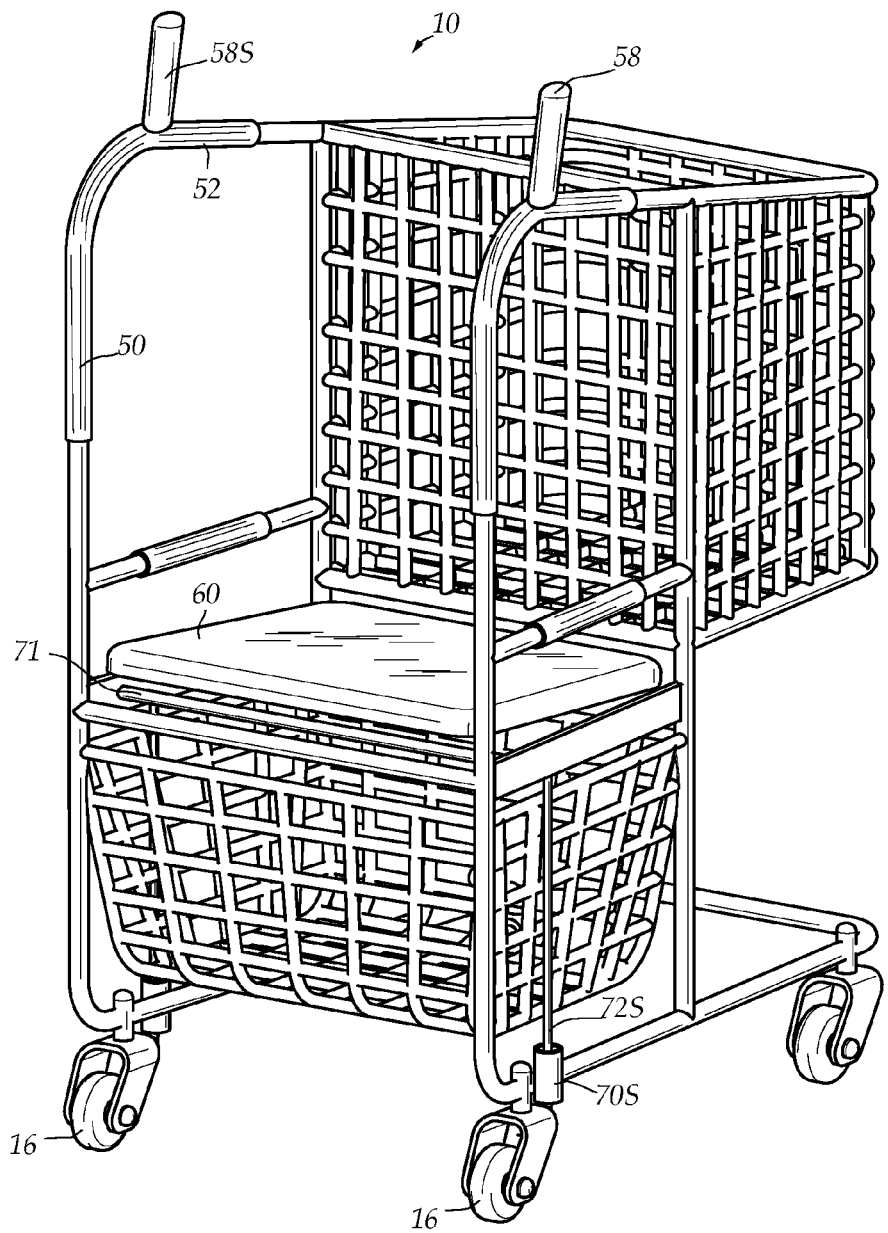
FIG. 5 is a dynamic perspective view from the rear of a further embodiment of the shopping cart with the rear seat in a down position.

FIG. 5 shows a further example embodiment of the shopping cart 10. In this example embodiment, the brake 70S is a dual brake, engaging a pair of wheels 16 when the seat 60 is in the down position. The dual brake has a pair of brake rods 72S connected to a horizontal pressure bar 71. When the seat is down and the user is sitting on the seat, the seat presses on the bar that pushes the dual brakes against the wheels, engaging the wheels, the pressure communicated through the rod 72S. The rods 72S are spring-loaded so that when the weight is released by the user rising off the seat 60, the rods retract upwards away from the wheel, releasing the dual brakes. It is understood that this is a non-limiting example and that other variations of the braking system presently disclosed are possible within the disclosed concept.

In yet a further example embodiment, the seat is hingedly connected to the horizontal pressure bar 71, operationally always coupling the brake 70S and seat 60. If the seat is selectively raised to a upright position for stowing, the seat 60 selectively locks in place. When the user sits on the seat, the seat automatically lowers in place and engages the brake, stopping the wheels 16.

In one example embodiment, mounted on the top segments of the arms 50 is a pair of hand grips 58, a hand grip on each arm. In a further example embodiment, the hand grips 58 have a textured surface 58S. The hand grips aid the user who has mobility and balance problems, allowing the user to grasp the cart arms standing in a more upright position.

A method for manufacturing the shopping cart 10 shown in FIG. 1 comprises coupling the lower base 14 to the support 20, the support extending vertically upwards from the base, coupling the arms 50 to the support 20, one arm on each side of the support, the top segment 52 of the arm extending from the top of the support rearwards, connecting to the vertical 54 segment extending downwards, the vertical segment connecting the arm 50 to the base 14 at the rear 14R, coupling the top shopping basket 18 to and extending frontwards from the support 20, and coupling the seat 60 to the support 20, the seat attaching substantially midway on the support and extending rearwards.

In one example embodiment, shown in FIG. 2, the seat 60 is hingedly coupled to the support 20 by the at least one hinge 62. In a further example embodiment, the step of coupling the seat 60 to the support 20 is followed by the step of coupling a second basket 80 to the frame 12 under the seat 60, the second basket accessible when the seat is in the up position.

In a further example embodiment of the method, as shown in FIG. 4, the step of operationally coupling the brake 70 to the seat 60 follows the step of coupling the seat to the support, the brake selectively engaging at least one wheel 16 on the wheeled base 14, the brake operative when the seat is in the down position and a user is sitting on the seat.

In yet another example embodiment of the method, the step of coupling the seat 60 to the support 20 is followed by coupling a pair of horizontal grab bars 56 slightly above the seat 60 in the down position, each bar connecting one vertical segment 54 of the arm 50 to the side of the support 20 opposite the arm, the bar providing support when a user grabs the bar upon rising from sitting.

A method of using the cart comprises the steps providing the shopping cart 10 to the user 100 for shopping in a store and collecting the cart 10 after the user has finished shopping. In one example embodiment, as illustrated in FIG. 3, the baskets 18 of the cart are coupled to the frame 12 so that the step of collecting the cart includes the step of collecting the plurality of carts and nesting them by inserting the front portion 30 of the first cart into the rear portion 40 of the second cart. FIG. 4 illustrations the user 100 sitting on the seat 60 of the cart 10. The user has a pair of feet 102 that rest on a floor 104 when the user is seated. A further method of using the cart comprises the user selecting a cart 10, pushing the cart forward by engaging the arms 50 of the cart and walking behind the rear portion 40, sitting in the cart by stopping, turning around and sitting on the seat 60, selectively grabbing the grab bars 56 as needed to maintain balance, engaging the brake 70 of the cart to prevent further movement of the cart. When the user has rested sufficiently, the step of sitting on the cart is followed by the step of standing up, selectively grabbing the grab bars as needed to maintain balance, turning around and engaging the arms of the cart and pushing the cart forward.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a shopping cart with a rear-facing seat for intermittent sitting and resting. The disclosure is illustrated by example in the drawing figures, and throughout the written description. It should be understood that numerous variations are possible, while adhering to the inventive concept. Such variations are contemplated as being a part of the present disclosure.

What is claimed is:

1. A shopping cart, comprising:

a frame having a horizontal lower wheeled base with a rear, the frame having a support with a pair of sides and a top, the support extending vertically upwards from the base, the support bifurcating the cart into a rear portion and a front portion, the frame having a pair of arms in the rear portion, an arm on each side of the support, the arms having a top segment extending from the top of the support rearwards connecting the top segment to a vertical segment extending downwards, connecting the arms to the base at the rear;

a top shopping basket in the front portion of the cart, the front basket attaching to and extending frontwards from the support; and a seat connecting to the support substantially midway, the seat in the rear portion, the seat for sitting and resting intermittently with a rear-facing orientation, the seat configured for sitting with feet on the floor, the rear portion having an open rear region opposite the support, configured for free access to the seat for sitting, configured for freely exiting the seat for standing, turning and resuming pushing the shopping cart through a store, the seat hingedly connected to the support, allowing the seat to selectively stow in an up position and to selectively lower in a down position for sitting.

2. The shopping cart as described in claim 1, wherein the seat is operationally connected to a brake, actuating the brake when the seat is in the down position and a user is sitting down on the seat, the brake engaging at least one wheel on the base when the brake is actuated.

3. The shopping cart as described in claim 2, wherein the cart has a second basket in the rear portion under the seat, accessible when the seat is in the up position.

4. The shopping cart as described in claim 1, wherein the top basket has a rear wall adjacent to the vertical support, the rear wall forming a seat back.

5. A shopping cart, comprising:

a horizontal lower wheeled base with a rear;

a front portion having a vertical support with a top and a pair of sides, the front portion having a top shopping basket attaching to and extending frontwards from the support;

a rear portion having a pair of arms, an arm having a top segment extending from the top of the support rearwards, connecting to a vertical segment, the vertical segment extending downwards connecting the arms to the base at the rear, the arms and the support defining an open alcove having a barrier-less rear region opposite the support; and a seat in the open alcove of the rear portion, the seat connecting to the support substantially midway, the seat for sitting and resting intermittently with a rear-facing orientation, the open alcove barrier-less, configured for free access to the seat for sitting and for freely exiting the seat for standing, turning and resuming pushing the shopping cart through a store, wherein the seat is hingedly connected to the support, allowing the seat to selectively stow in an up position and to selectively lower in a down position for sitting.

6. The shopping cart as described in claim 5, wherein the seat is operationally connected to a brake, actuating the brake when the seat is in the down position and the user is sitting down on the seat, the brake engaging at least one wheel on the wheeled base when the brake is actuated.

7. The shopping cart as described in claim 6, wherein the brake has at least one spring that disengages the brake from the wheel when the seat no longer engages the brake.

8. The shopping cart as described in claim 7, wherein the cart has a second basket in the rear portion accessible when the seat is in the up position.

9. A method for manufacturing a shopping cart, comprising:

coupling a horizontal lower wheeled base with a rear to a support with a pair of sides and a top, the support extending vertically upwards from the base, coupling a pair of arms to the support, an arm on each side of the support, the arm having a top segment extending from the top of the support rearwards coupling to a vertical segment extending downwards, the vertical segment coupling to the base at the rear;

coupling a top shopping basket to and extending frontwards from the support; and coupling a seat to the support, the seat attaching substantially midway on the support and extending rearwards, the seat hingedly coupling to the support, the seat for sitting and resting intermittently with a rear-facing orientation when pushing the shopping cart through a store, the hinged coupling allowing the seat to selectively raise temporarily to an up position to access a storage area and to selectively lower to a down position for sitting.

10. The method for manufacturing the shopping cart as described in claim 9, further comprising the step of:

coupling a second basket to the base under the seat, the second basket accessible when the seat is in the up position follows the step of coupling the seat to the support.

11. The method for manufacturing the shopping cart as described in claim 9, further comprising the step of:

operationally coupling a brake to the seat, the brake operative when the seat is in the down position and a user is sitting on the seat, the brake selectively engaging at least one wheel on the wheeled base follows the step of coupling the seat to the support.

\* \* \* \* \*